(12) United States Patent
Heldman et al.

(10) Patent No.: US 11,431,500 B2
(45) Date of Patent: Aug. 30, 2022

(54) AUTHORIZATION CODE MANAGEMENT FOR PUBLISHED STATIC APPLICATIONS

(71) Applicant: salesforce.com, inc., San Francisco, CA (US)

(72) Inventors: Kyle Edward Heldman, San Francisco, CA (US); Brian Ray Brinegar, San Francisco, CA (US); Chad Anthony Vanhorn, San Francisco, CA (US); Dinesh Rajasekharan, San Francisco, CA (US); Joshua Allen Bronson, San Francisco, CA (US); Joshua Thomas Armstrong, San Francisco, CA (US); John Rice, San Francisco, CA (US); Nathan Corn, San Francisco, CA (US); Tyler Staley, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 264 days.

(21) Appl. No.: 16/740,188

(22) Filed: Jan. 10, 2020

(65) Prior Publication Data
US 2021/0160072 A1    May 27, 2021

Related U.S. Application Data

(60) Provisional application No. 62/940,754, filed on Nov. 26, 2019.

(51) Int. Cl.
*H04L 9/32* (2006.01)
*G06F 16/958* (2019.01)

(52) U.S. Cl.
CPC .......... *H04L 9/3213* (2013.01); *G06F 16/958* (2019.01); *H04L 9/3247* (2013.01); *H04L 2209/64* (2013.01)

(58) Field of Classification Search
CPC ...................................................... H04L 9/3213
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |

(Continued)

*Primary Examiner* — Simon P Kanaan
(74) *Attorney, Agent, or Firm* — Schwabe Williamson & Wyatt

(57) ABSTRACT

Among other things, embodiments of the present disclosure are directed to providing authorization code management for published static applications. Other embodiments may be described and/or claimed.

18 Claims, 17 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteqee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,356,711 B1 * | 4/2008 | Calinov .............. H04L 9/3226 |
| | | 713/180 |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,478,434 B1 * | 1/2009 | Hinton ................ G06F 16/958 |
| | | 726/27 |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,908,649 B1 * | 3/2011 | Arora ................. H04L 67/2814 |
| | | 726/7 |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,985,786 B1 * | 5/2018 | Bhabbur ............... H04L 9/3226 |
| 10,893,033 B2 | 1/2021 | Heldman et al. |
| 10,904,314 B2 | 1/2021 | Rice et al. |
| 11,012,233 B1 * | 5/2021 | Uhr ...................... H04L 9/3239 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0217288 A1 * | 11/2003 | Guo ..................... H04L 63/0807 |
| | | 726/10 |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |

(56) References Cited

U.S. PATENT DOCUMENTS

| | | |
|---|---|---|
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0229239 A1* | 10/2005 | Gray ................... G06F 21/41 726/4 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0119754 A1* | 5/2009 | Schubert ............. H04L 63/205 726/4 |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2020/0045037 A1 | 2/2020 | Parks et al. |
| 2020/0137037 A1 | 4/2020 | Rice et al. |
| 2021/0112059 A1 | 4/2021 | Heldman et al. |

* cited by examiner

AUTHORIZATION CODE MANAGEMENT FOR PUBLISHED STATIC APPLICATIONS

PRIORITY

This application claims the benefit of U.S. Provisional Application No. 62/940,754, filed Nov. 26, 2019, which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to authorization code management for published static applications. Other embodiments may be described and/or claimed.

BACKGROUND

Some application programming interface (API) applications desire or require using standardized libraries or software development kits (SDKs) to provide authorization (e.g., using OAuth 2.0 Authorization Code). In conventional systems with unique endpoints for every tenant across a marketing cloud, this becomes problematic as a standard library does not support dynamic authorization endpoints, but rather expects static endpoints to get an access_token. Embodiments of the present disclosure address these and other issues by providing access_tokens for an approved end user to multi-tenant applications.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatuses, computer-implemented methods, and computer-readable storage media for providing authorization code management for published static applications.

I. System Examples

Figure 1A:
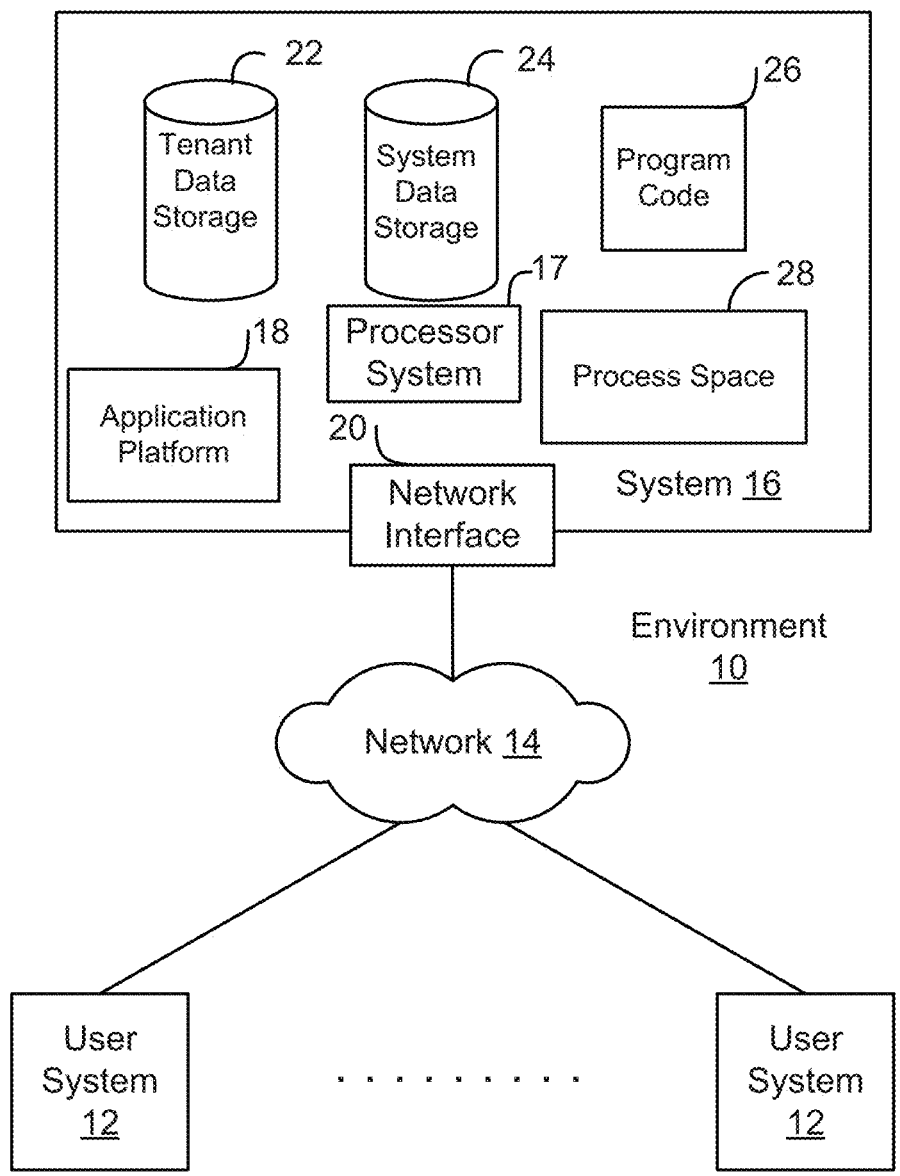
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
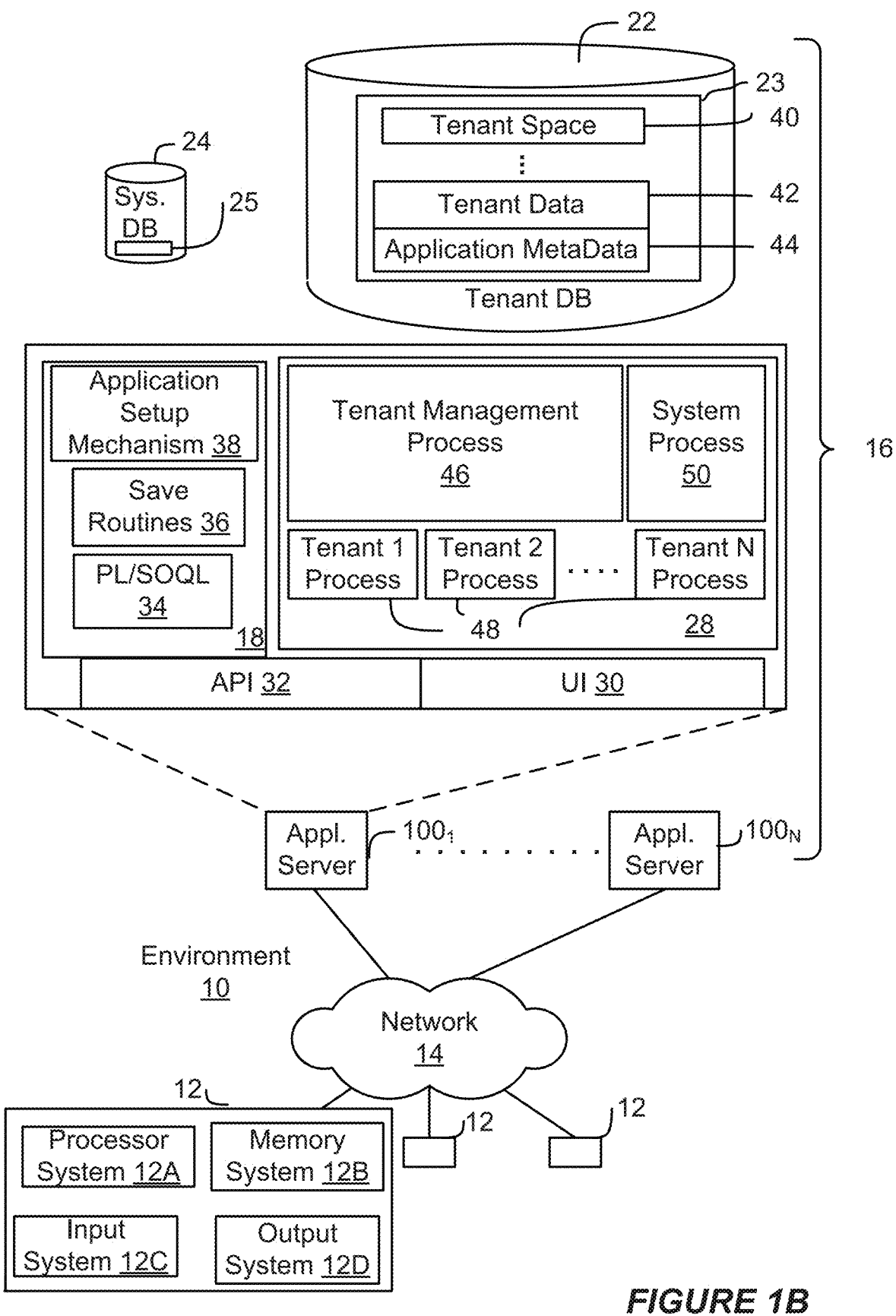
FIG. 1B is a block diagram illustrating examples of implementations of elements of FIG. 1A and examples of interconnections between these elements according to various embodiments of the present disclosure.

FIG. 1B shows a block diagram with examples of implementations of elements of FIG. 1A and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touch-screen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 100$_1$ can be coupled via the network 14 (for example, the Internet), another application server 100$_{N-1}$ can be coupled via a direct network link, and another application server 100$_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Authorization Code Management for Published Static Applications

In conventional systems, a multi-tenant often must call a customer's tenant specific endpoint, thus forcing modification to standard libraries by developers. Conventional systems thus fail to satisfy the need for some multi-tenant applications to use a standard library and require the correct tenant-specific endpoint is used to acquire the token, rather than after token acquisition but during token use.

In embodiments of the present disclosure, by contrast, developers can request authorization for a given user using the application's tenant-specific endpoints to obtain both the authorization code and access_token. In some embodiments, the /token API call returns the appropriate access_token (self-encoded signed token) and customer specific endpoints required to use the access_token. It is at this time, and not prior, that the multi-tenant application may use the customer's tenant specific endpoint. This enables them to use standard OAuth 2.0 libraries and software developer kits (SDKs) where the application's tenant specific endpoint can be hardcoded and modification is not necessary to support dynamic authorization endpoints.

Self-encoded signed tokens utilized in conjunction with embodiments of the present disclosure help allow an entity to call into disparate data centers without requiring real time, low latency, mission critical authentication replication. Typically this problem is solved via CDN and global authentication services with authentication information replicated enterprise wide.

The following terms may be used in conjunction with the description of the embodiments of the present disclosure:

Client=Client Application, external application that accesses data in a Marketing Cloud (e.g., Customer, Partner);

Tenant=Account, Customer's Account;

Credentials=Unique identifiers tied to a Client Application, akin to Username/Password;

Tenant Specific Endpoint (TSE)=Combination of Tenant Specific Subdomain and the API Endpoint. The Subdomain is unique to a Tenant. The Endpoint maps to the Service Application's functionality. Leveraging a Tenant Specific Endpoint requests specific Service Application functionality for a given Tenant;

Service=Functionality provided by a provider;

Published Static Application=A Client Application that utilizes the OAuth 2.0 Authorization Code flow to request an AccessToken at the Application's Endpoint on behalf of the User;

Published Application=A Client Application that utilizes the OAuth 2.0 Authorization Code flow to request an AccessToken at the User's Endpoint on behalf of the User.

Figure 2:
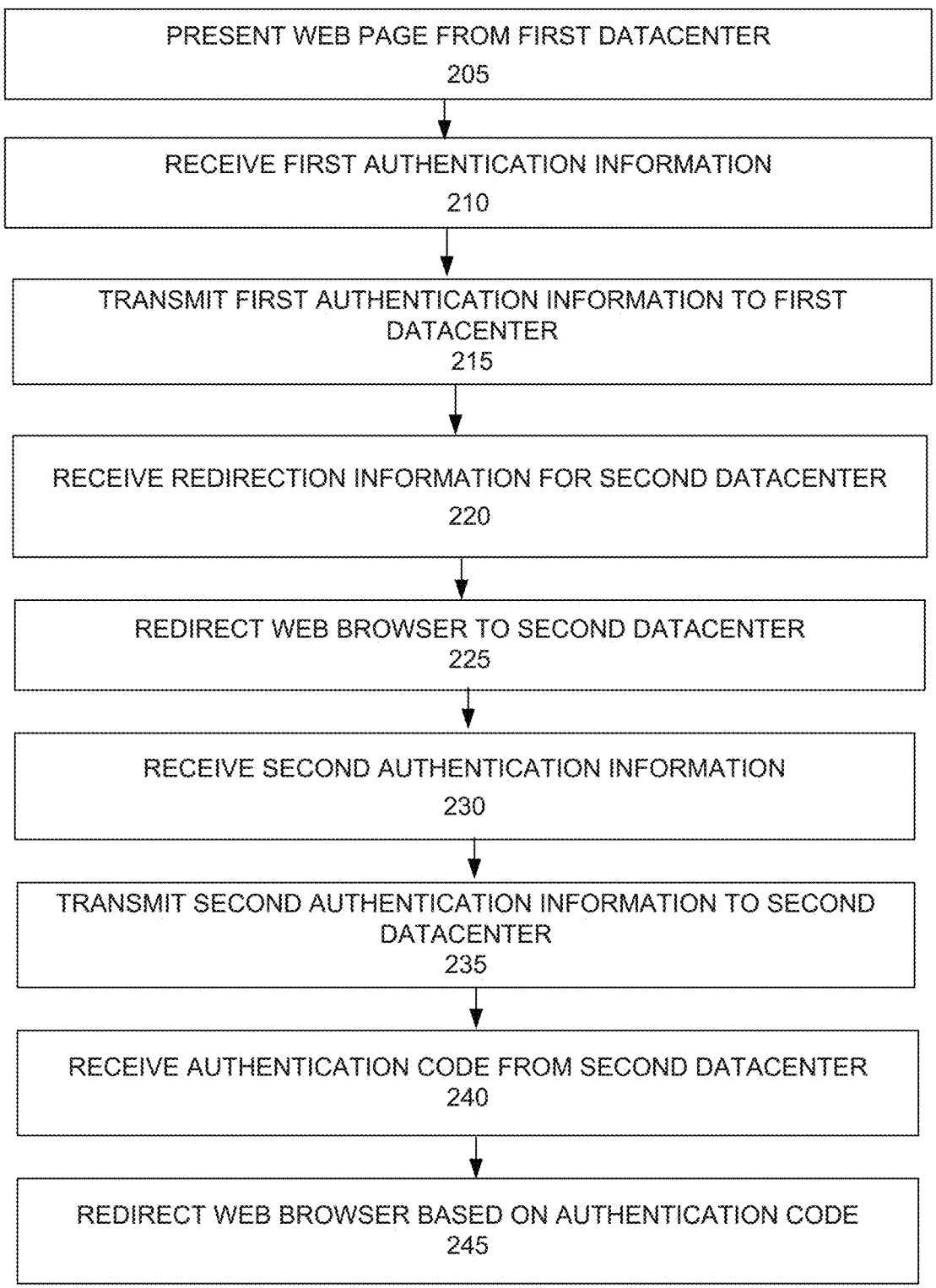
FIG. 2 is a flow diagram illustrating an example of a process according to various embodiments of the present disclosure.

FIG. 2 is a flow diagram illustrating an example of a process 200 according to various aspects of the present disclosure. Any combination and/or subset of the elements of the methods depicted herein (including method 200 in FIG. 2, and the processes depicted in FIGS. 3A-5D) may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

In this example, process 200 includes presenting (e.g., on the display screen of a client computer system such as user system 12 in FIGS. 1A and 1B) a web page from a first datacenter (205). Process 200 further includes receiving (e.g., via an input device of a client computer system such as user system 12 in FIGS. 1A and 1B) first authentication information (210), transmitting the first authentication information to the first datacenter (215), receive redirection information for a second datacenter (220), and redirecting the web browser to the second datacenter based on the redirection information (225). Process 200 further includes receiving second authentication information (230), transmitting the second authentication information to the second datacenter (235), receiving an authorization code from the second datacenter (240), and redirecting the web browser based on the authentication code (245). The first and second data centers may be implemented using one or more server systems (e.g., system 16 illustrated in FIGS. 1A and 1B) connected to a client computer system via a network (e.g., network 14 in FIGS. 1A and 1B).

Figure 3A:
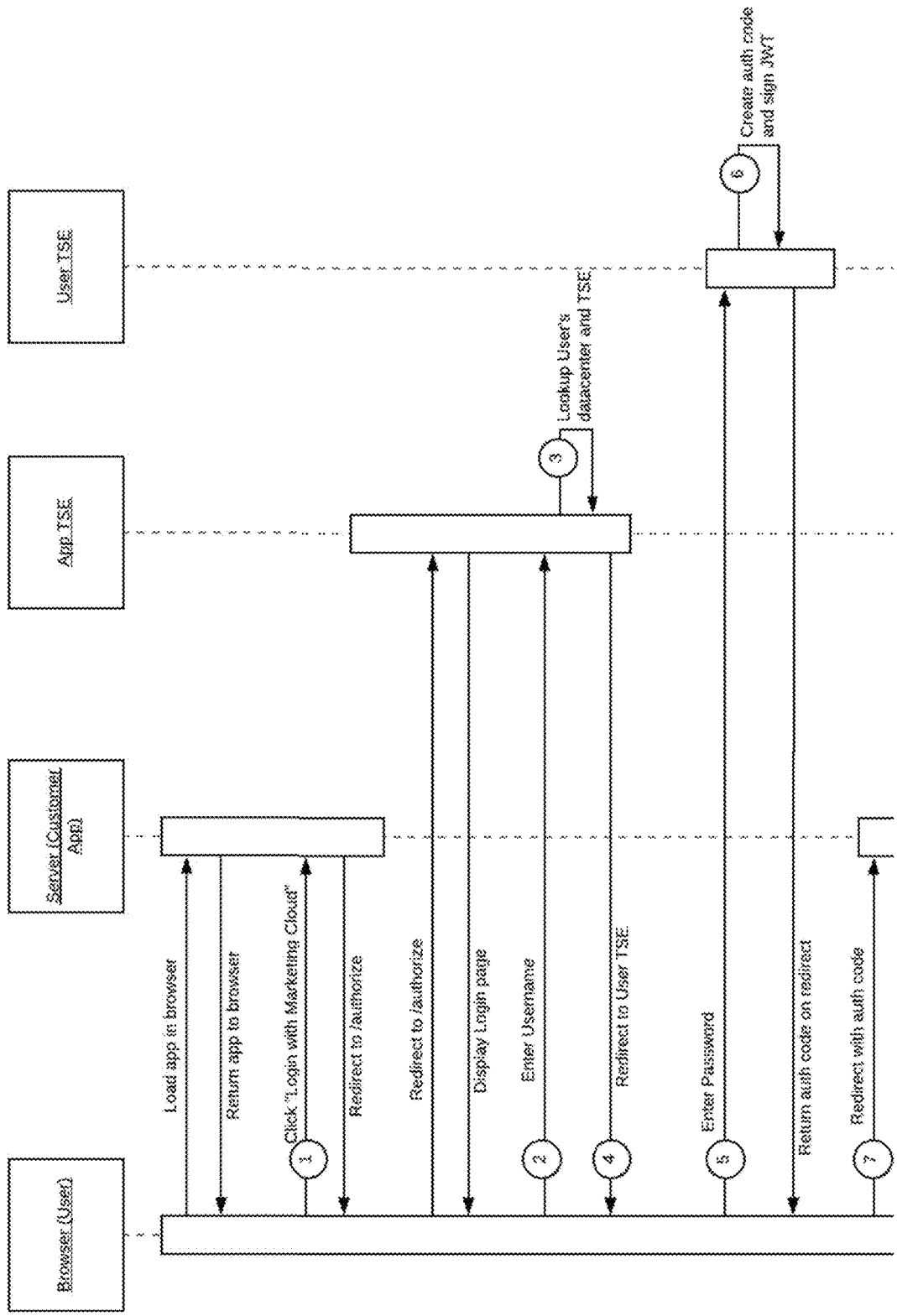
FIG. 3A illustrates an example of a process according to various embodiments of the present disclosure.
Figure 3B:
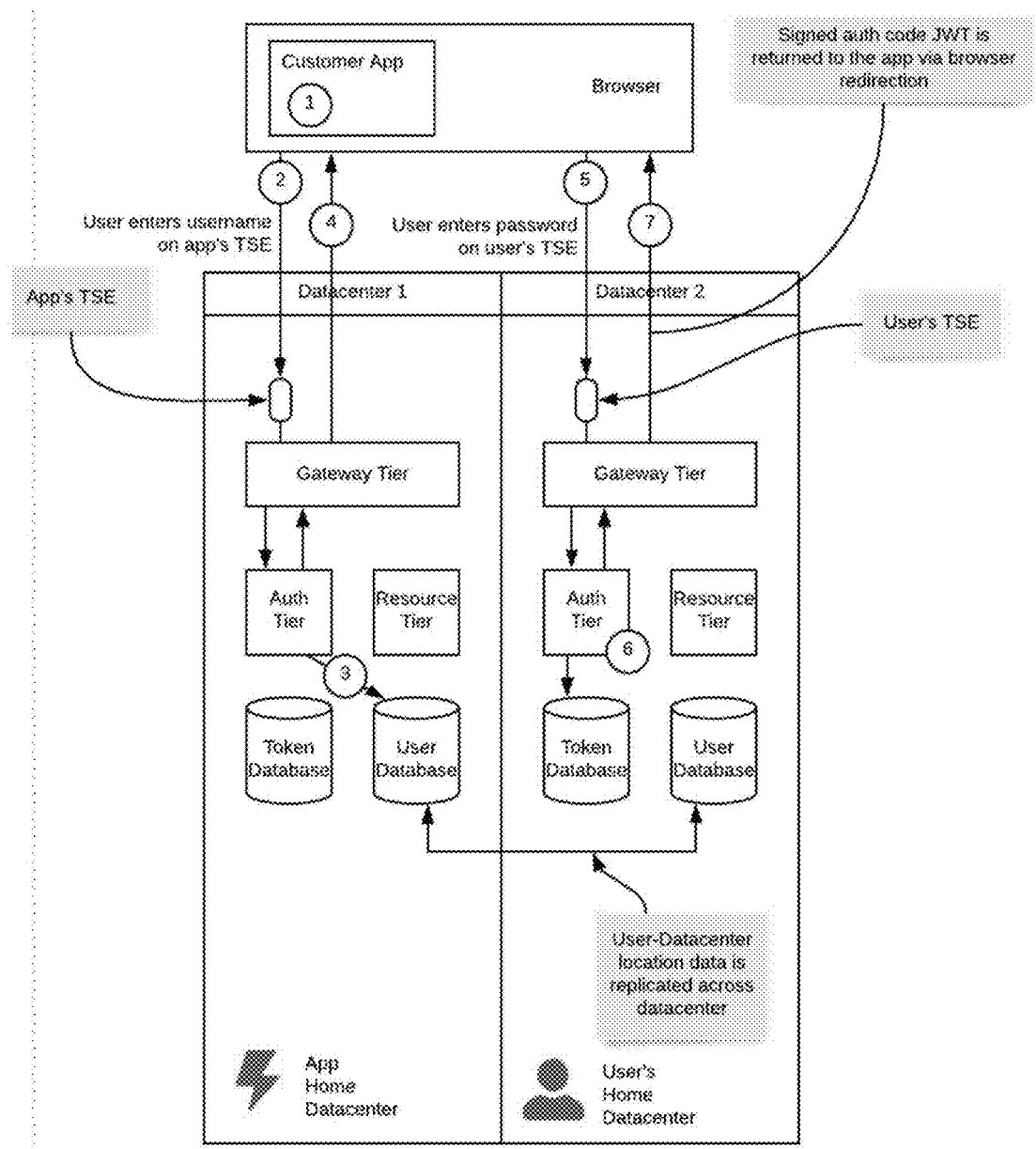
FIG. 3B is a block diagram illustrating the functionality of the process depicted in FIG. 3A.

FIGS. 3A and 3B illustrate an example of a process in accordance with method 200 shown in FIG. 2, whereby a published static application receives an authorization code using a single (first) datacenter and TSE for a user associated with a different (second) datacenter and TSE. In step (1) the client computer system of a user (e.g., user system 12 in FIG. 1A) presents (205), on its display screen via a web browser, a web page received from a first datacenter associated with a tenant-specific endpoint (TSE) for a software application operating on the client computer system (labeled "App Home Datacenter" in FIG. 3B).

Figure 6A:
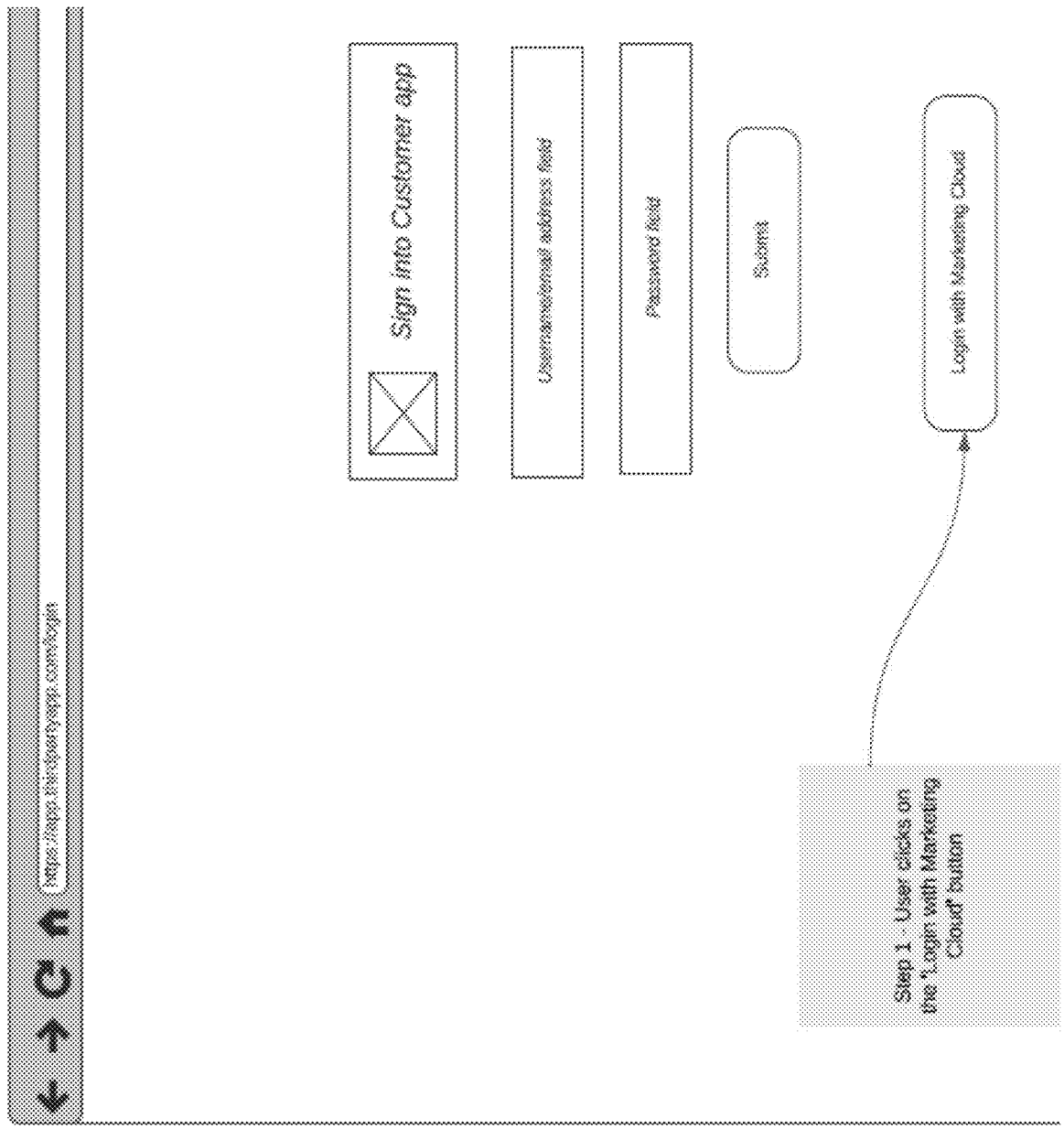
FIGS. 6A-6D illustrate examples of interactions with web browser windows according to various embodiments of the present disclosure.

In some embodiments, the client computer system may present, via the display screen of the user interface, a login page including an option to perform an authorization, such as the "Login with Marketing Cloud" button in FIG. 6A. As shown in FIGS. 3A and 6A, the user selects the "Login with Marketing Cloud" button, therefore causing the client computer system to receive, via the input device, a selection of the option to perform the authorization. The client computer system then redirects the web browser to the first datacenter associated with the application's TSE to receive the web page.

Figure 6B:
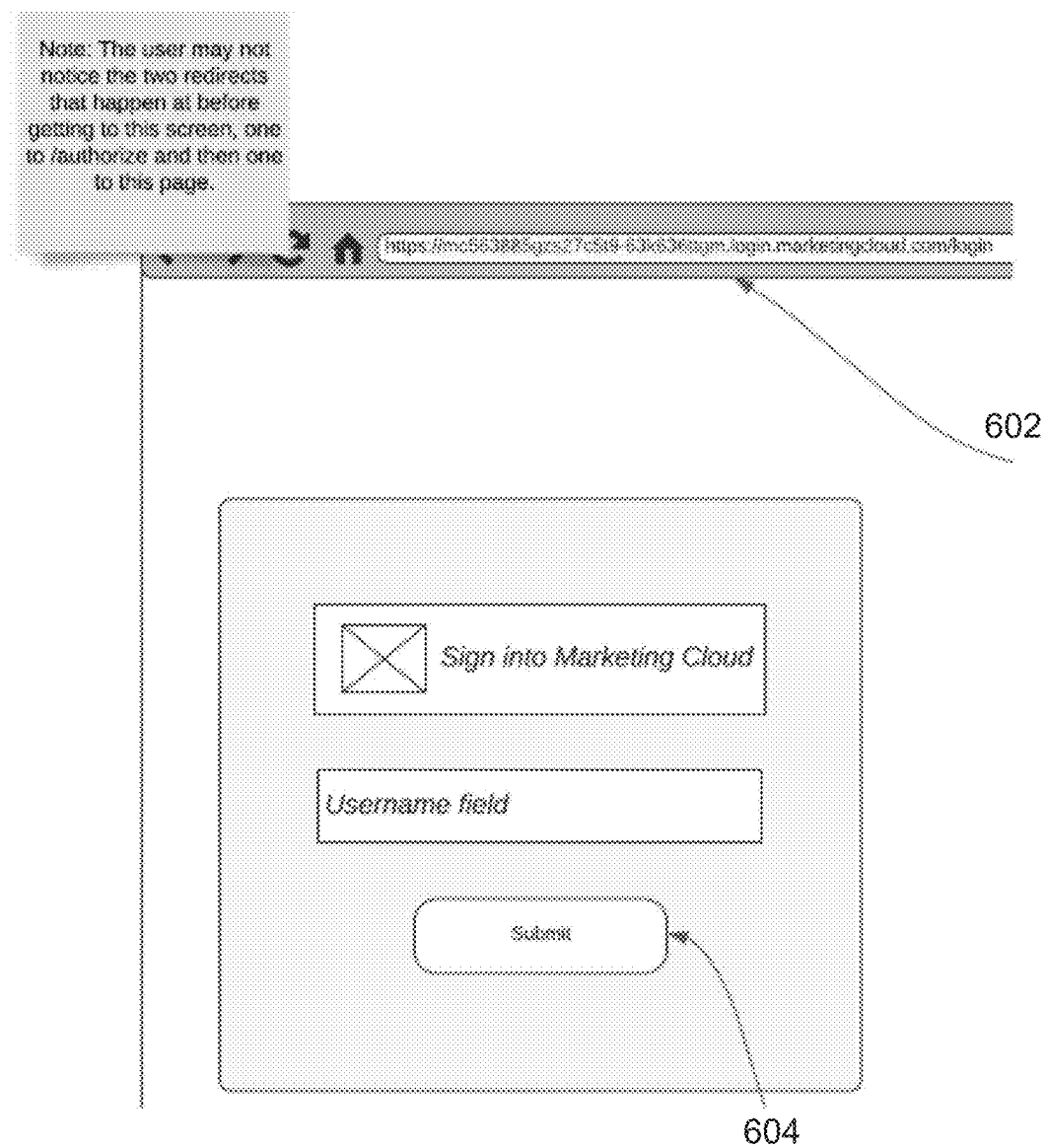

As noted at the top of FIG. 6B, the browser address 602 may be redirected multiple times. In this example, the first portion of the browser address (the portion with "mc563885gzs27c5t9-63k63ttgm") is associated with the TSE at the first (application home) datacenter shown in FIG. 3B. At 604 in FIG. 6B and step (2) in FIG. 3A, the user enters the user's username into the "username field" and clicks submit, thereby causing the client computer system to receive (210), via the input device into the web page presented in the web browser, first authentication information (the username in this example) for a user of the client computer system.

The first datacenter receives the first authentication information and, at step (3) in FIG. 3A, looks up information regarding the user's datacenter and TSE (labeled "User's Home Datacenter" in FIG. 3B, and also referred to as the "second datacenter" in this example). The client computer system receives, from the first datacenter, redirection information associated with the second datacenter associated with a TSE for the user (220) and redirects (225) the web browser to the second datacenter based on the redirection information, as shown in step (4) of FIG. 3A.

Figure 6C:
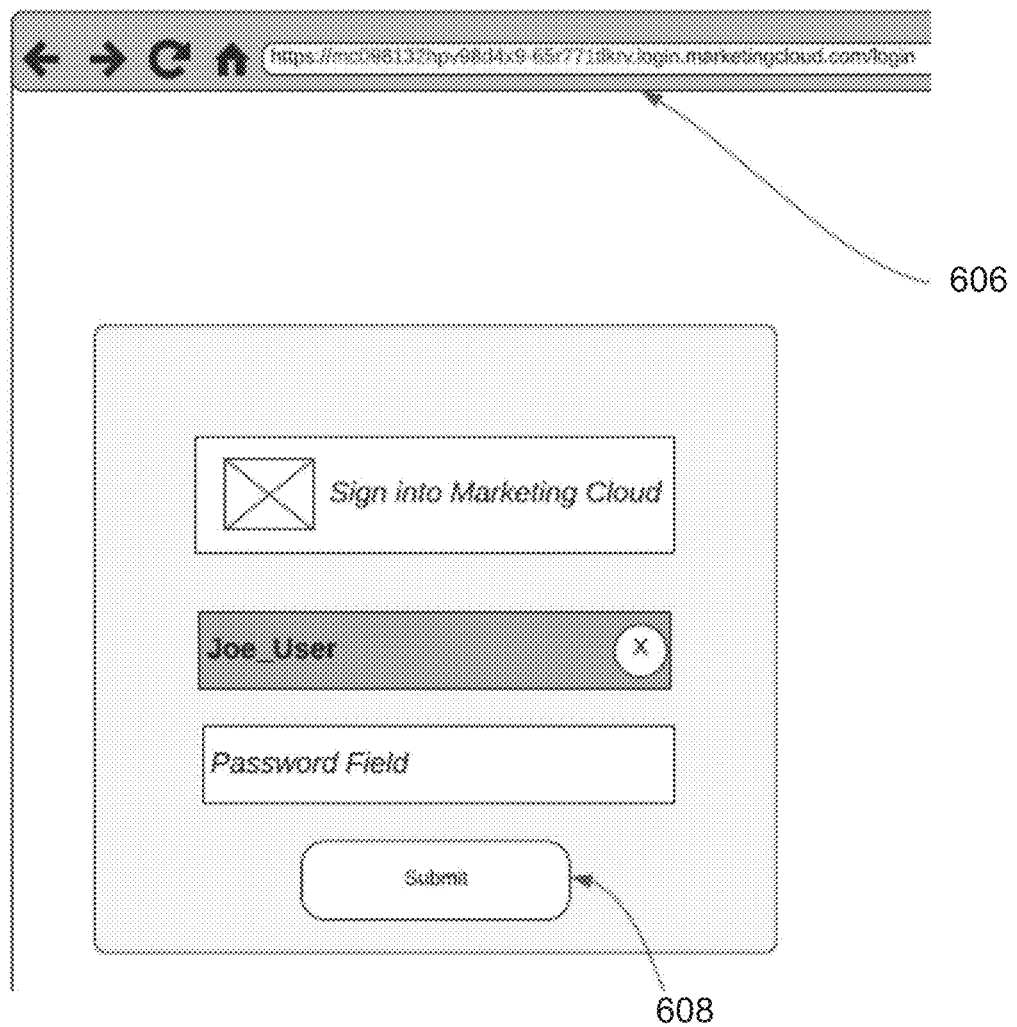

FIG. 6C illustrates an example of a web browser screen after redirection to the second data center associated with the user's TSE. In this example, the browser address 606 has changed and its first portion is associated with the user's TSE at the second (user's home) datacenter in FIG. 3B. As further shown in FIG. 6C and step (5) of FIG. 3A, the user enters second authentication information (a password in this example) and clicks the submit button at 608, thereby causing the client computer system to receive, via the input device via the web browser, second authentication information for the user (230).

The second authentication information is transmitted to the second datacenter (235), and the user's TSE at the second datacenter (at step (6) in FIGS. 3A and 3B) creates a signed authorization code, a Javascript Object Notation Web Token (JWT) in this example.

Figure 6D:
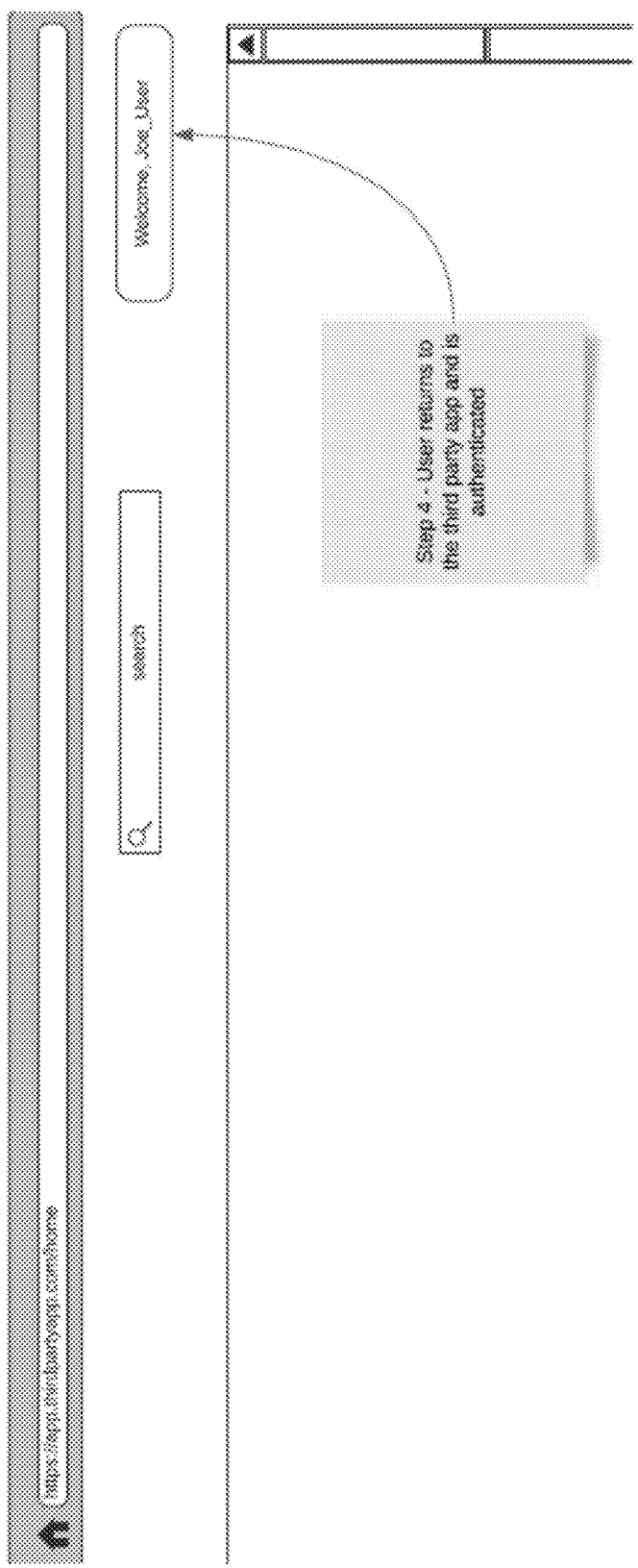

The client computer system receives the authentication code from the second datacenter (240), and at step (7) in FIGS. 3A and 3B, redirects the web browser based on the received authentication code (245). FIG. 6D provides an example where the browser is redirected to the original address shown in FIG. 6A, along with an indication that the user has been authenticated.

In this example, the first authentication information is a username associated with the user that the first datacenter (the "App Home Datacenter" in FIG. 3B) uses to lookup information regarding the user's TSE and datacenter (the "User's Home Datacenter" in FIG. 3B). In this case, the user's datacenter/TSE information is replicated across both user databases in both datacenters as shown in FIG. 3B. The second datacenter then provides the authorization token in response to a correct second authentication information, which is a password associated with the user in this case.

In alternate embodiments, more than two pieces of authentication information may be used. Further, alternate embodiments need not utilize a username/password combination. In some embodiments, for example, the first or second pieces of authentication information could be (or include) a selection of a link associated with an image (e.g., to prevent automated hacking attempts), as well as one or more time-sensitive codes (e.g., used in conjunction with a two-factor-auth system), as well as other information.

In the preceding example, the authentication token is a self-encoded signed token generated by the TSE associated with the user. Among other things, self-encoded signed tokens allow one entity to call into disparate data centers without requiring real time, low latency, mission critical authentication replication. In previous systems, this problem is typically solved via a content delivery network (CDN) and global authentication services with authentication information replicated enterprise-wide.

In some embodiments, a variety of information may be provided in a response from a datacenter/TSE in addition to the access token. In one example, as part of this response, a tenant specific endpoint (highlighted below in boldface) may be used alongside the token provided:

```
{
"access_token":"00Dx0000000BV7z!AR8AQP0jITN80ESEsj5EbaZTFG0R",
"refresh_token":"5Aep8614iLM.Dq661ePDmPEgaAW9Oh_L3JKkDpB4xReb54",
"expires_in":1200,
"token_type":"Bearer",
"rest_instance_url":"<tenant specific base URL>",
"soap_instance_url":"<tenant specific base URL>",
"scope": "email_read email_write email_send"
}
```

In the preceding example depicted in FIGS. 3A and 3B, the authentication token is a self-encoded signed token generated by the TSE associated with the user. Among other things, self-encoded signed tokens allow one entity to call into disparate data centers without requiring real time, low latency, mission critical authentication replication. In previous systems, this problem is typically solved via a content delivery network (CDN) and global authentication services with authentication information replicated enterprise-wide.

In the preceding example depicted in FIG. 3A, the software application operating on the client computer system is loaded into the web browser prior to presenting the web page from the first datacenter. The software application may interact with the browser and the datacenters using various application program interface (API) calls. For example, redirecting of the web browser to the second data center may be performed by the software application via an API call to the web browser.

Figure 4A:
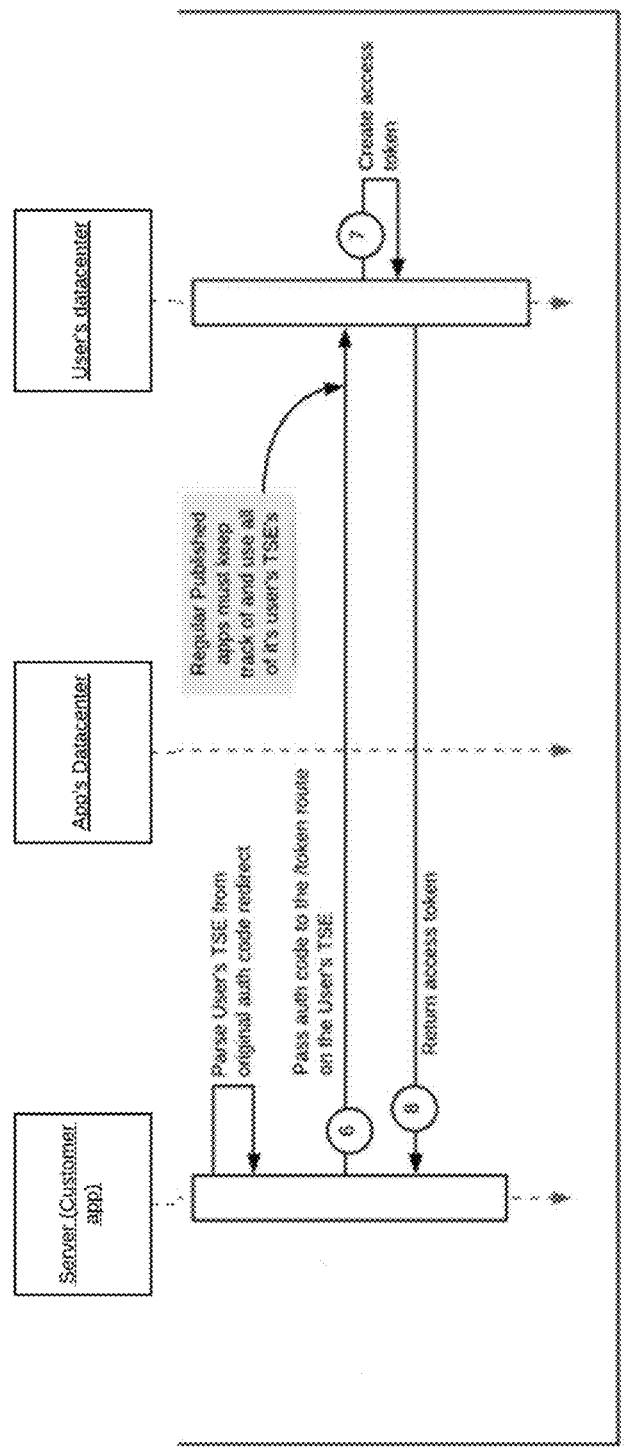
FIG. 4A illustrates an example of a process according to various embodiments of the present disclosure.
Figure 4B:
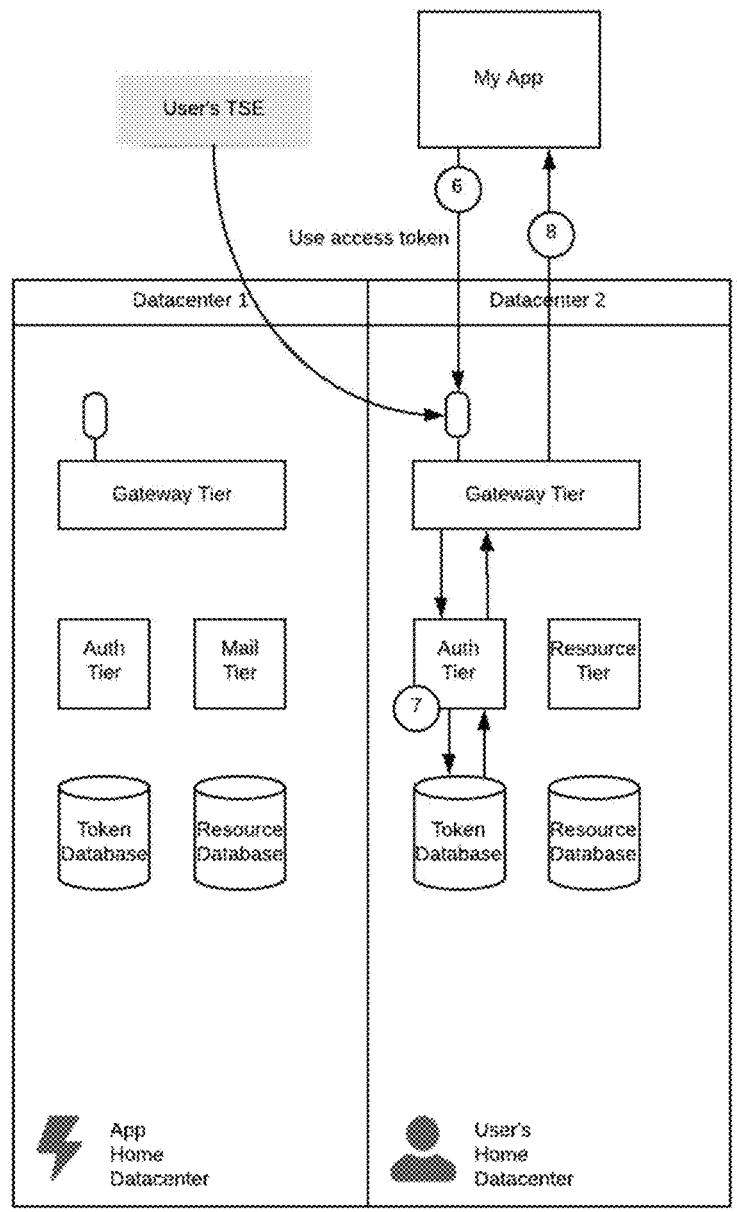
FIG. 4B is a block diagram illustrating the functionality of the process depicted in FIG. 4A.
Figure 4C:
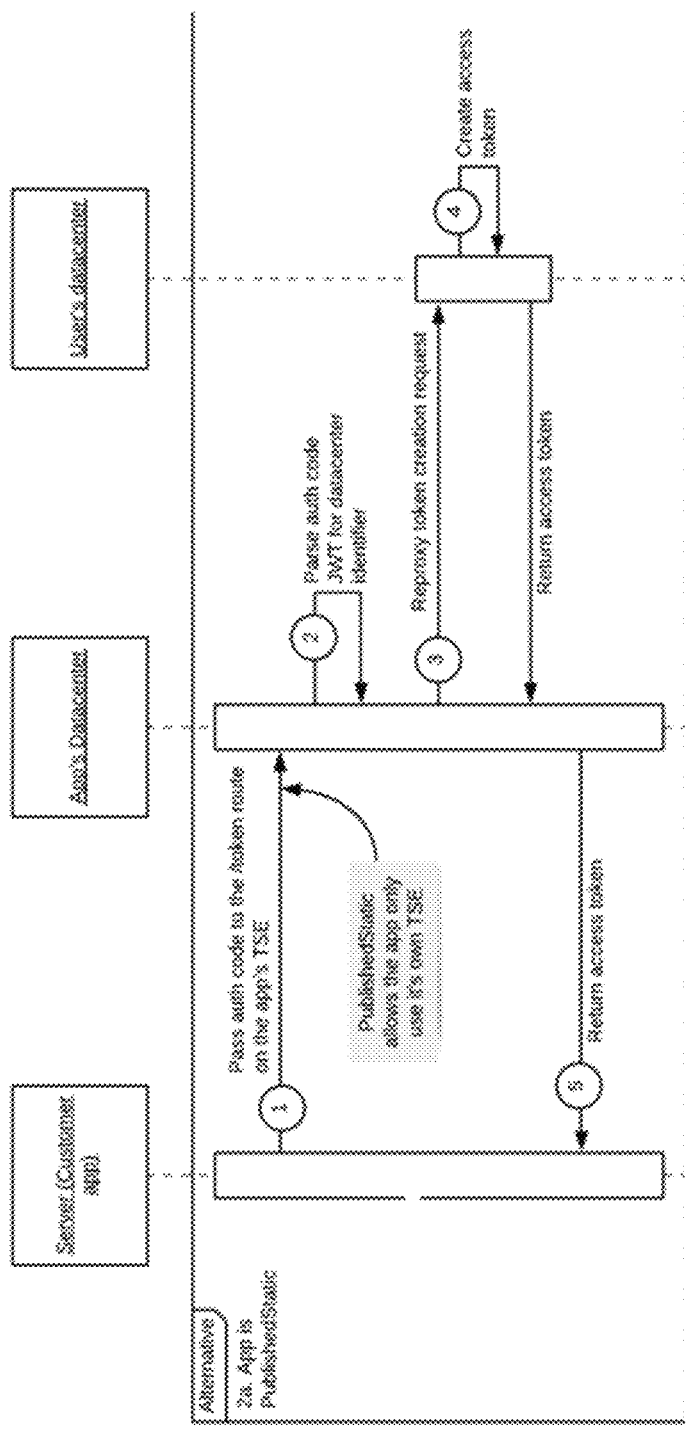
FIG. 4C illustrates an example of a process according to various embodiments of the present disclosure.
Figure 4D:
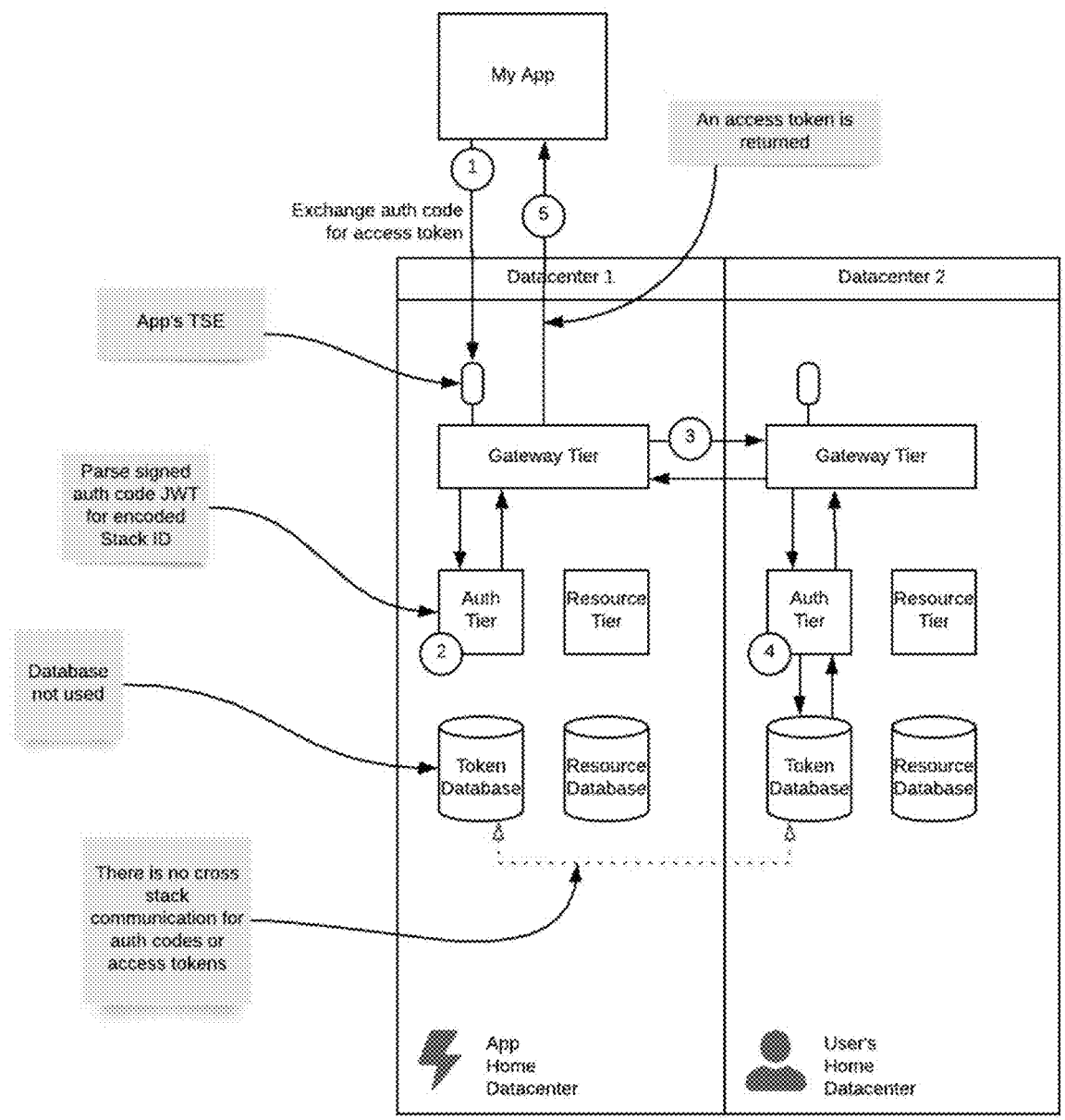
FIG. 4D is a block diagram illustrating the functionality of the process depicted in FIG. 4C.

FIGS. 4A-4D illustrate a comparison of processes for a software application exchanging an authorization code for an access token. The difference between the application using only a user's TSE (a published application) is illustrated in FIGS. 4A and 4B, while the application using only the application's TSE (a published static) is illustrated in FIGS. 4C and 4D.

As illustrated in FIG. 4A, a typical published application must keep track of, and use, all of its user's TSE's. In this example, a server associated with a customer/user application parses the user's TSE from an original authorization code redirection. At step (6), the application passes the application to the datacenter associated with the user's TSE, which creates an access token at step (7) and returns the access token at step (8). As further illustrated in FIG. 4B, steps 6-8 in FIG. 4A are handled entirely using the user's home datacenter.

In FIGS. 4C and 4D, by contrast, embodiments of the present disclosure may utilize interaction between the application's datacenter and user's datacenter to handle the authentication. In step (1), an authorization code is passed to the application's datacenter ("App Home Datacenter" in FIG. 4D) which parses the authorization code for the user's datacenter identification information. At step (3), the application datacenter re-proxies a token creation request to the user's datacenter via the gateway tiers of the two respective datacenters. At step (4), the user's datacenter creates the access token and returns it to the application datacenter, and the application datacenter returns the access token to the application at step (5). As noted in FIG. 4D, this process does not require the use of the token databases on the application datacenter, nor is there any cross-stack communication for authorization codes or access tokens.

Figure 5A:
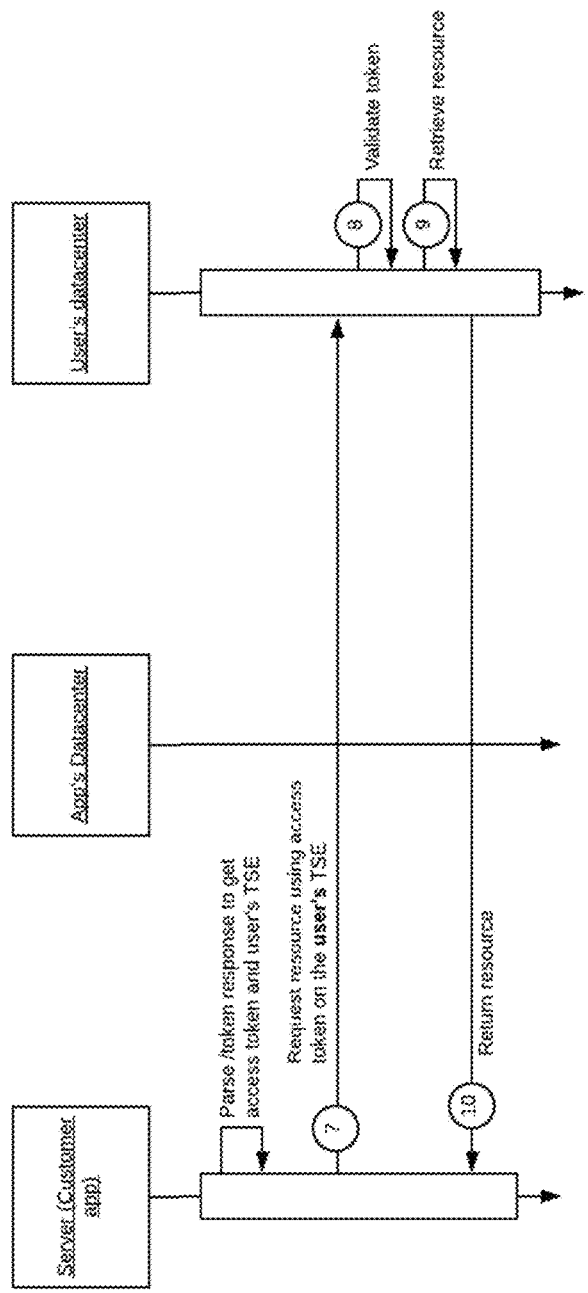
FIG. 5A illustrates an example of a process according to various embodiments of the present disclosure.
Figure 5B:
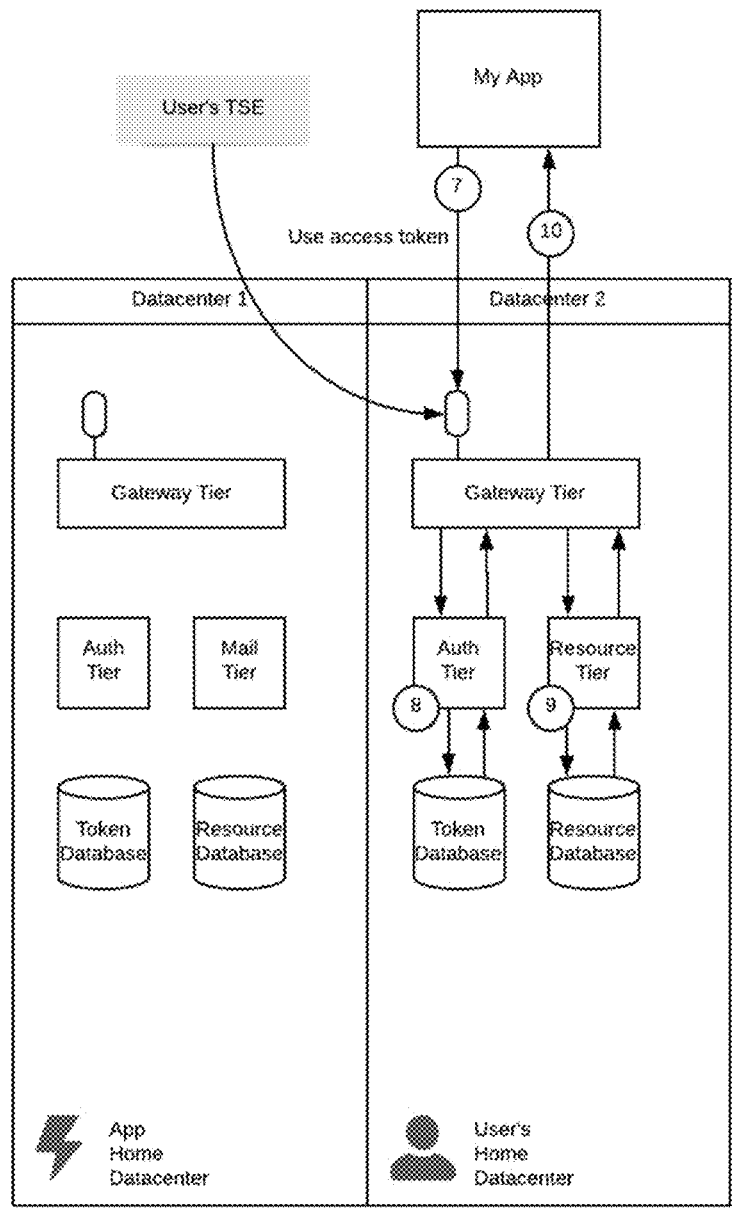
FIG. 5B is a block diagram illustrating the functionality of the process depicted in FIG. 5A.
Figure 5C:
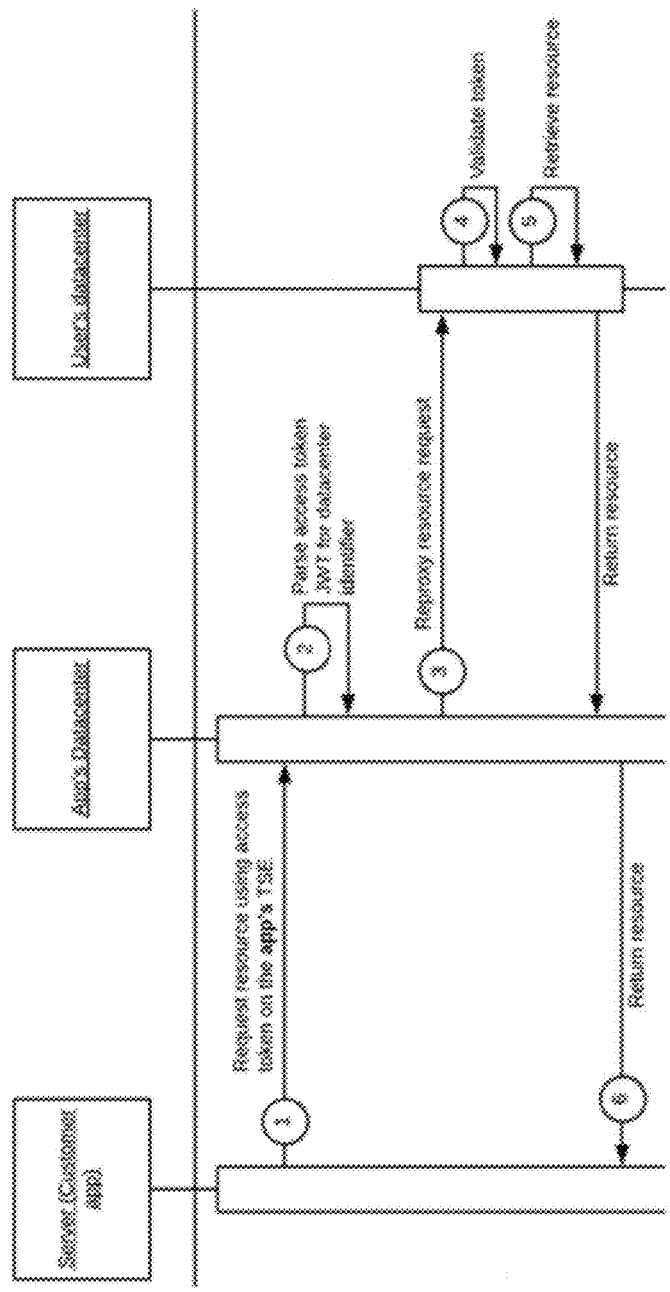
FIG. 5C illustrates an example of a process according to various embodiments of the present disclosure.
Figure 5D:
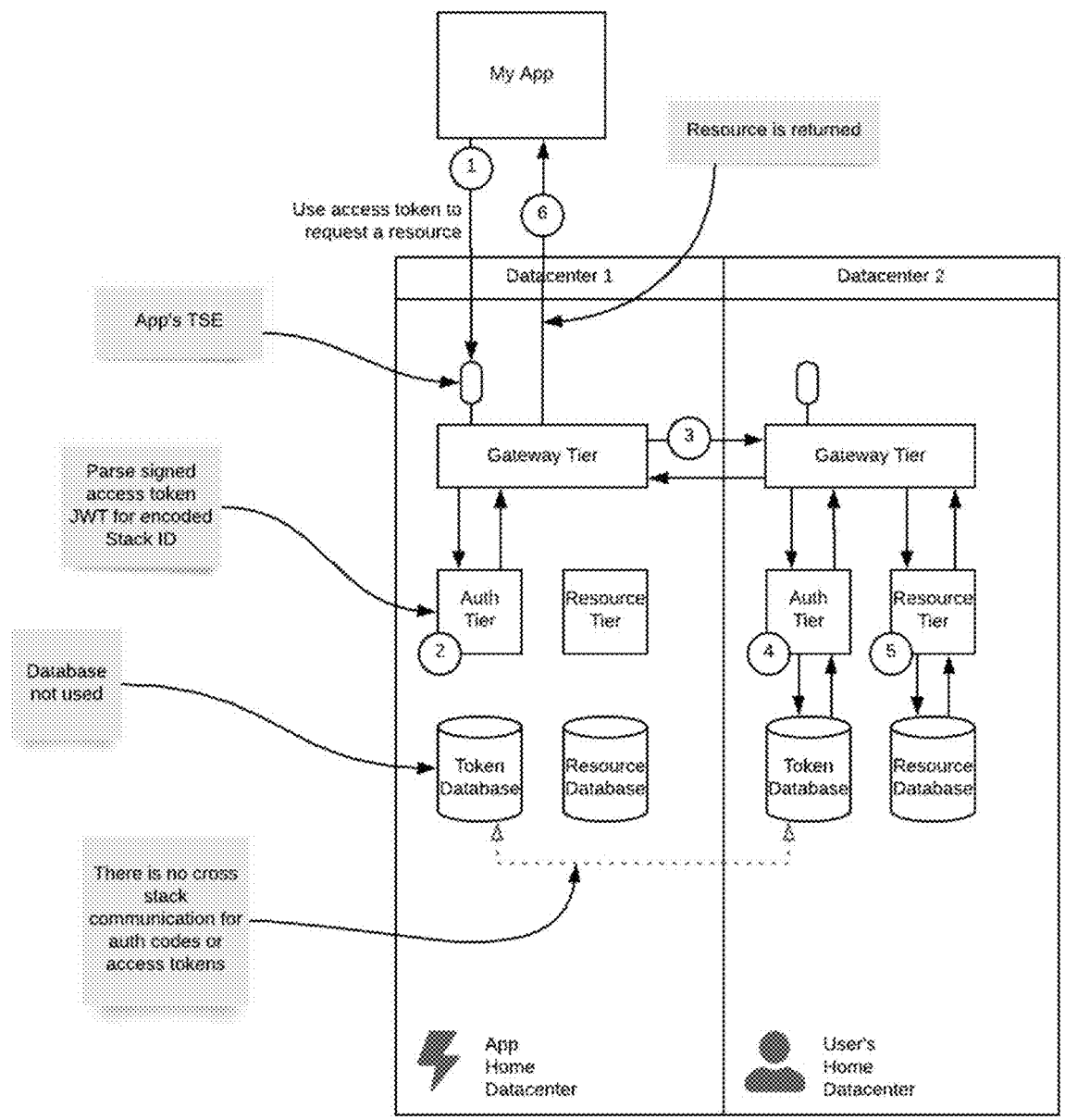
FIG. 5D is a block diagram illustrating the functionality of the process depicted in FIG. 5C.

FIGS. 5A-5D illustrate another example comparing an application utilizing an access token. FIGS. 5A and 5B illustrate a published application using only the user's TSE, while FIGS. 5C and 5D illustrate a published static application using only the application's TSE.

In FIGS. 5A and 5B, at step (7) the application sends a request for a resource using an access token on the user's TSE at the user's datacenter. The user's datacenter validates the token at step (8), retrieves the resource at step (9), and returns the resource to the application at step (10).

In FIGS. 5C and 5D, at step (1) the application requests a resource using an access token on the application's TSE at the application's datacenter. The application's datacenter parses the access token for the user's datacenter identification information at step (2), and re-proxies the resource request to the user's datacenter at step (3). The user's data center validates the token at step (4), retrieves the resource at step (5), and returns the resource to the application's datacenter. At step (6) the resource is returned from the application's datacenter to the application.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:
1. A client computer system comprising:
a processor;
a user interface coupled to the processor, the user interface including an input device and a display screen; and
memory coupled to the processor and storing instructions that, when executed by the processor, cause the client computer system to perform operations comprising:
presenting, on the display screen via a web browser, a web page received from a first datacenter associated with a tenant-specific endpoint (TSE) for a software application operating on the client computer system;
receiving, via the input device into the web page presented in the web browser, first authentication information for a user of the client computer system;
transmitting the first authentication information to the first datacenter;
receiving, from the first datacenter, redirection information for a second datacenter associated with a TSE for the user;
redirecting the web browser to the second datacenter based on the redirection information;
receiving, via the input device via the web browser, second authentication information for the user;
transmitting the second authentication information to the second datacenter;
receiving an authentication token from the second datacenter, wherein the authentication token is a self-encoded signed token generated by the TSE associated with the user to allow access by the user to resources on the second datacenter; and
redirecting the web browser based on the received authentication token.

2. The system of claim 1, wherein the memory further stores instructions for causing the client computer system to perform operations comprising:
presenting, via the display screen of the user interface, a login page including an option to perform an authorization;
receiving, via the input device, a selection of the option to perform the authorization; and
redirecting the web browser to the first datacenter to receive the web page.

3. The system of claim 1, wherein the first authentication information is a username associated with the user, and the second authentication information is a password associated with the user.

4. The system of claim 1, wherein the memory further stores instructions for causing the client computer system to perform operations comprising:
subsequent to redirecting the web browser to the second datacenter, presenting a second web page received from second application datacenter; and
receiving the second authentication information via the input device into the second web page.

5. The system of claim 1, wherein the software application operating on the client computer system is loaded into the web browser prior to presenting the web page from the first datacenter.

6. The system of claim 1, wherein the redirecting of the web browser to the second datacenter is performed by the software application via an application program interface (API) call to the web browser.

7. A tangible, non-transitory computer-readable medium storing instructions that, when executed by a client computer system, cause the client computer system to perform operations comprising:
presenting, on a display screen coupled to the client computer system and via a web browser, a web page received from a first datacenter associated with a tenant-specific endpoint (TSE) for a software application operating on the client computer system;
receiving, via an input device coupled to the client computer system and into the web page presented in the web browser, first authentication information for a user of the client computer system;
transmitting the first authentication information to the first datacenter;
receiving, from the first datacenter, redirection information for a second datacenter associated with a TSE for the user;
redirecting the web browser to the second datacenter based on the redirection information;
receiving, via the input device via the web browser, second authentication information for the user;
transmitting the second authentication information to the second datacenter;
receiving an authentication token from the second datacenter, wherein the authentication token is a self-encoded signed token generated by the TSE associated with the user to allow access by the user to resources on the second datacenter; and
redirecting the web browser based on the received authentication token.

8. The computer-readable medium of claim 7, wherein the medium further stores instructions for causing the client computer system to perform operations comprising:
presenting, via the display screen, a login page including an option to perform an authorization;
receiving, via the input device, a selection of the option to perform the authorization; and
redirecting the web browser to the first datacenter to receive the web page.

9. The computer-readable medium of claim 7, wherein the first authentication information is a username associated with the user, and the second authentication information is a password associated with the user.

10. The computer-readable medium of claim 7, wherein the medium further stores instructions for causing the client computer system to perform operations comprising:
subsequent to redirecting the web browser to the second datacenter, presenting a second web page received from second application datacenter; and
receiving the second authentication information via the input device into the second web page.

11. The computer-readable medium of claim 7, wherein the software application operating on the client computer system is loaded into the web browser prior to presenting the web page from the first datacenter.

12. The computer-readable medium of claim 7, wherein the redirecting of the web browser to the second datacenter is performed by the software application via an application program interface (API) call to the web browser.

13. A method comprising:
presenting, by a client computer system on a display screen coupled to the client computer system and via a web browser, a web page received from a first datacenter associated with a tenant-specific endpoint (TSE) for a software application operating on the client computer system;
receiving, by the client computer system via an input device coupled to the client computer system and into the web page presented in the web browser, first authentication information for a user of the client computer system;
transmitting the first authentication information to the first datacenter;
receiving, by the client computer system from the first datacenter, redirection information for a second datacenter associated with a TSE for the user;
redirecting, by the client computer system, the web browser to the second datacenter based on the redirection information;
receiving, by the client computer system via the input device via the web browser, second authentication information for the user;
transmitting, by the client computer system, the second authentication information to the second datacenter;
receiving, by the client computer system, an authentication token from the second datacenter, wherein the authentication token is a self-encoded signed token generated by the TSE associated with the user to allow access by the user to resources on the second datacenter; and
redirecting, by the client computer system, the web browser based on the received authentication token.

14. The method of claim 13, further comprising:
presenting, by the client computer system via the display screen, a login page including an option to perform an authorization;
receiving, by the client computer system via the input device, a selection of the option to perform the authorization; and
redirecting, by the client computer system, the web browser to the first datacenter to receive the web page.

15. The method of claim 13, wherein the first authentication information is a username associated with the user, and the second authentication information is a password associated with the user.

16. The method of claim 13, further comprising:
- subsequent to redirecting the web browser to the second datacenter, presenting a second web page received from second application datacenter; and
- receiving the second authentication information via the input device into the second web page.

17. The method of claim 13, wherein the software application operating on the client computer system is loaded into the web browser prior to presenting the web page from the first datacenter.

18. The method of claim 13, wherein the redirecting of the web browser to the second datacenter is performed by the software application via an application program interface (API) call to the web browser.

\* \* \* \* \*